(12) United States Patent
Cross et al.

(10) Patent No.: US 7,477,242 B2
(45) Date of Patent: Jan. 13, 2009

(54) CAPACITIVE TOUCH SCREEN WITH CONDUCTIVE POLYMER

(75) Inventors: Elisa M. Cross, Woodbury, MN (US); Robert S. Moshrefzadeh, Oakdale, MN (US); Frank J. Bottari, Acton, MA (US); Darran R. Cairns, Billerica, MA (US); Anthony F. Chernefsky, Dracut, MA (US); Paul J. Richter, Chelmsford, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 1099 days.

(21) Appl. No.: 10/152,260

(22) Filed: May 20, 2002

(65) Prior Publication Data

US 2003/0213624 A1 Nov. 20, 2003

(51) Int. Cl.
G06F 3/033 (2006.01)
G06F 3/042 (2006.01)
G06F 3/041 (2006.01)
G06C 21/00 (2006.01)

(52) U.S. Cl. .................. 345/179; 345/176; 345/173; 178/18.06

(58) Field of Classification Search ......... 345/173–183; 178/18.06
See application file for complete search history.

(56) References Cited

U.S. PATENT DOCUMENTS

| | | | |
|---|---|---|---|
| 4,293,734 A | 10/1981 | Pepper, Jr. | |
| 4,371,746 A | 2/1983 | Pepper, Jr. | |
| 4,516,112 A * | 5/1985 | Chen | 341/34 |
| 5,650,597 A | 7/1997 | Redmayne | |
| 5,738,934 A | 4/1998 | Jones | |
| 5,742,119 A | 4/1998 | Aben et al. | |
| 5,760,715 A * | 6/1998 | Senk et al. | 341/33 |
| 5,766,515 A | 6/1998 | Jonas et al. | |
| 5,777,898 A | 7/1998 | Teterwak | |
| 6,163,313 A | 12/2000 | Aroyan et al. | |
| 6,340,496 B1 * | 1/2002 | Cloots et al. | 427/58 |
| 6,469,267 B1 * | 10/2002 | Welsh et al. | 200/512 |
| 6,661,408 B2 * | 12/2003 | Chen | 345/173 |

FOREIGN PATENT DOCUMENTS

| | | |
|---|---|---|
| EP | 0 686 662 | 4/1995 |
| EP | 0 727 875 | 8/1996 |
| EP | 1 172 831 | 7/2001 |
| WO | WO 99/59101 | 11/1999 |
| WO | WO 01/88958 A2 | 11/2001 |
| WO | WO 03/046882 | 6/2003 |

* cited by examiner

*Primary Examiner*—Kevin M Nguyen
(74) *Attorney, Agent, or Firm*—Robert S. Moshrefzadeh

(57) ABSTRACT

A capacitive touch screen is described with a touch area including a substantially transparent conductive polymer. The capacitive touch screen also includes circuitry connecting the conductive polymer of the touch area to a power source, where the circuitry is configured to determine a location of a capacitive coupling on the touch area.

44 Claims, 2 Drawing Sheets

CAPACITIVE TOUCH SCREEN WITH CONDUCTIVE POLYMER

FIELD OF THE INVENTION

The present invention generally relates to touch sensors, particularly touch sensors that are used in conjunction with a display device to form a touch screen.

BACKGROUND OF THE INVENTION

Capacitive touch screens include a conductive layer on a substrate. A capacitive touch screen typically consists of a glass substrate with a thin-film conductive coating on top of the glass. On top of this is an anti-scratch glass overcoat. This seals in the sensor electronics and makes the device resistant to scratches.

Circuits at the edges of a typical capacitive screen uniformly distribute a low-voltage AC field over the conductive surface. When a finger or other conductive object disrupts that field, the controller measures the change in current flowing from each corner and calculates the X and Y coordinates, which indicates the point of the screen where the user is touching.

Typically, the conductive layer is a substantially transparent conductor such as indium tin oxide (ITO), antimony tin oxide (ATO), or zinc oxide (ZnO), which are examples of substances generally referred to as transparent conductive oxides (TCOs). However there are some problems with TCOs in capacitive touch panels. The typical sheet resistance of TCOs in certain applications is listed in Table A. Capacitive touch systems require relatively high sheet resistance compared to other applications.

TABLE A.

| Application for TCO | Resistivity (Ohms per square) |
|---|---|
| Electronic displays such LCDs | 10-100 |
| Resistive touch systems | 100-500 |
| Capacitive touch systems | 1000-2500 |

In order to increase the sheet resistance of a TCO, a thinner film of the TCO is typically deposited. For example, an ITO film with a sheet resistance of 20 ohms per square is about 500 nm thick. An ITO having sheet resistance of 350-400 ohms per square is only about 35-30 nm thick. Uniformity, durability, and physical continuity of a deposited TCO are generally degraded as the film is coated thinner. For example, ITO is generally not coated at a resistivity of 1000-2000 ohms per square because it has to be so thin that it may not be durable, uniform or physically continuous. Performance is further degraded if the substrate top surface is non-uniform, which is often the case. ATO can be coated thicker for higher sheet resistance. For example, a coating of ATO that is 25-30 nm thick results in a sheet resistance of about 2000 ohms per square. However, ATO has inferior optical properties compared to ITO, such as lower transmission.

As a result, an improved conducting layer of a capacitive touch panel is needed that provides durability and good optical properties.

SUMMARY OF THE INVENTION

The present invention relates to a capacitive touch screen with a touch area including a substantially transparent conductive polymer acting as a primary signal carrier for making a capacitive coupling to an object at a touch location. The capacitive touch screen also includes circuitry connecting the conductive polymer of the touch area to a power source, where the circuitry is configured to determine the touch location.

Preferably, the touch area does not include a transparent conductive oxide. It is also preferred that the conductive polymer is the only transparent conductive element in the touch area. In one embodiment, the capacitive touch screen further includes a protective coating on the conductive polymer, which may serve as a dielectric. The conductive polymer may be PEDOT. The touch area may include a sheet of conductive polymer having a substantially uniform resistance, or could include a pattern of conductive polymer.

In another embodiment, a touch sensitive display module includes a touch area, circuitry and a display device viewable through the touch area. The touch area includes a substantially transparent conductive polymer acting as a primary signal carrier for making a capacitive coupling to an object at a touch location. The circuitry connects the conductive polymer of the touch area to a power source, where the circuitry is configured to determine the touch location.

In another embodiment of the present invention, a method of making a capacitive touch screen includes providing a substrate and forming a touch area on the substrate. The touch area includes a substantially transparent conductive polymer, wherein the conductive polymer is configured to act as a primary signal carrier for making a capacitive coupling to an object. Preferably, the method also includes forming a protective layer on the touch area. The object maybe a user's body part, a conductive stylus, or a conductive stylus connected to an earth ground.

BRIEF DESCRIPTION OF THE DRAWINGS

The invention may be more completely understood in consideration of the following detailed description of various embodiments of the invention in connection with the accompanying drawings.

Figure 1:
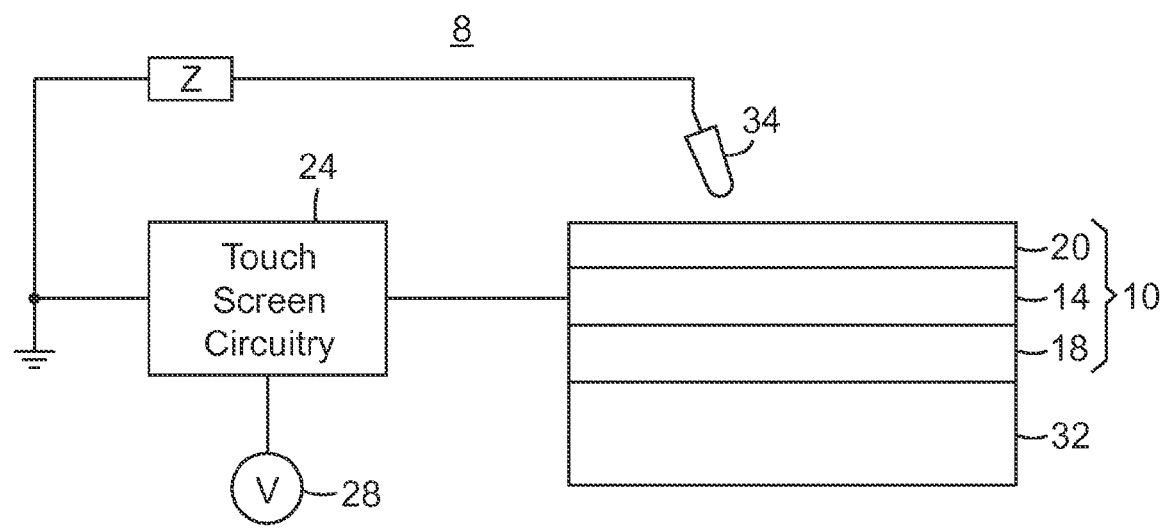
FIG. 1 is a schematic view of an exemplary touch screen apparatus in accordance with one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENT

The present invention is applicable to a number of touch screens using capacitive technology and incorporating a conductive transparent polymer. While the present invention is not so limited, an appreciation of various aspects of the invention will be gained through a discussion of the examples provided below.

A capacitive-type touch screen includes a resistance or impedance element, such as a length or area of resistive material, having a terminal at each end or boundary. In the prior art, the resistance element is made of a transparent conductive oxide (TCO), such as ITO, ATO or ZnO. However, in the present invention, the resistance element includes a conductive polymer. The use of a conductive polymer may provide many advantages over a TCO, as discussed in further detail herein.

As used herein, "conductive polymer" refers to polymers that are electrically conductive. Some examples of conductive polymers are polypyrrole, polyaniline, polyacetylene, polythiophene, polyphenylene vinylene, polyphenylene sulfide, poly p-phenylene, polyheterocycle vinylene, and materials disclosed in European Patent Publication EP-1-172-831-A2, which is hereby incorporated by reference herein in its entirety. EP-1-172-831-A2 discusses using a conductive polymer in the place of ITO in resistive touch panels and does not discuss capacitive touch panels. A preferred substituted polythiophene is poly (3,4-ethylenedioxythiophene) (PEDOT), described in U.S. Pat. No. 5,766,515 and EP-A 686,662, which are both hereby incorporated by reference herein. Preferably, the conductive polymers used in touch screens described herein are intrinsically conductive, meaning that they are conductive without the addition of conductive materials such as carbon, although conductive polymers usually require the addition of a dopant.

Preferably, the resistance element is substantially transparent, i.e. at least about 50% transparent for internal transmission and preferably at least about 90% transparent for internal transmission. More preferably, the resistance element is at least about 95% transparent for internal transmission.

FIG. 1 shows a schematic view of one example of a capacitive touch device 8 including a capacitive touch sensor 10. A cross section of the touch sensor 10 is shown including a conductive polymer 14 as the resistance element. In one embodiment of the present invention, the resistance element is a surface of uniform resistivity. The touch sensor 10 also includes a substrate 18 and a protective layer 20. The substrate 18 of the touch sensor may be rigid or flexible. The substrate 18 may be glass, thin plastic, or a thick or rigid plastic sheet. A plastic substrate provides the advantage of being lightweight and difficult to break.

The protective layer 20 is optional. If present, the protective layer 20 may serve as a dielectric to limit the capacitive coupling between the touch and the resistance element. The protective layer 20 may also increase the life of the resistance element 14. The protective layer 20 may optionally be structured to provide other functions, such as reducing glare or reducing reflection. The touch sensor 10 is not limited to these layers. The touch sensor may include additional layers providing other functions.

The touch device 8 also includes touch screen circuitry 24 and a power source 28. The circuitry 24 is electrically connected to the resistance element 14. The circuitry 24 calculates the location of a capacitive coupling on the resistive element 14. The touch sensor 10 may be positioned on or integrated with a display device 32.

The resistance element in one embodiment may be a rectangular shaped surface of uniform resistance. For convenience, this embodiment will be described in detail with respect to a touch screen having a rectangular touch area, although the concepts discussed could be applied to touch screens of different configurations, such as a one-axis touch area with a length of a uniform resistance or a triangular surface.

For a rectangular resistance element, the touch screen may include four terminals, a resistive coupling network, an oscillator that varies the potential of the terminals with respect to ground, current-sensing circuitry to measure the current through each terminal, and normalizing circuitry to produce an output signal related to the location of the touch. The currents are measured and the ratio of the current allows for derivation of the coordinates of the point touched. The resistive coupling network, oscillator, current-sensing circuitry, and normalizing circuitry of the touch screen may be constructed as taught in U.S. Pat. Nos. 4,293,734 and 4,371,746, both to Pepper, Jr., both of which are incorporated by reference herein in their entirety.

The capacitive touch sensor of the present invention may be activated in a number of different ways by an object 34 that forms a capacitive coupling with the resistance element. The object may be a user's finger or other body part, or a conductive structure that is connected to ground, such as a conductive stylus that is connected to ground via a wire. The object 34 provides a path to ground when it contacts or gets sufficiently close to the touch screen, creating a capacitive coupling with the resistance element of the touch screen. The circuitry 24 may also be connected to an earth ground.

In operation, when an object 34 contacts or couples with the resistance element, a relatively low impedance path to ground is provided for the oscillator signal, and a small electric current flows through the contacting structure 34 to ground. The fraction of this current flowing through a boundary is inversely proportional to the distance from the boundary of the point touched, and directly proportional to the distance from an opposite boundary. An output voltage is produced proportional to this fraction, and thus, to the distance from the other terminal. The output provides a binary signal to the utilization device indicating that the resistance element is being touched.

Figure 2:
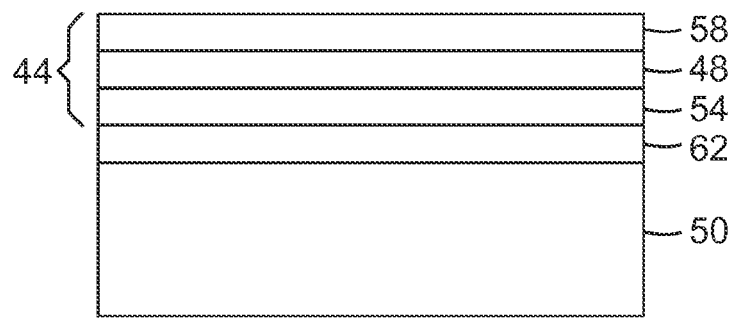
FIG. 2 is a schematic view of another exemplary touch screen apparatus in accordance with another embodiment of the invention.

FIG. 2 illustrates an embodiment of a capacitive sensor structure 40, where a flexible capacitive sensor 44 having a transparent conductive polymer 48 is laminated to a rigid substrate 50. The flexible capacitive sensor 44 includes a flexible substrate 54, the conductive polymer 48, and a protective layer 58. The rigid substrate 50 may be plastic or glass. Adhesive 62 joins the rigid substrate 50 to the flexible substrate 54 of the flexible capacitive sensor 44.

Figure 3:
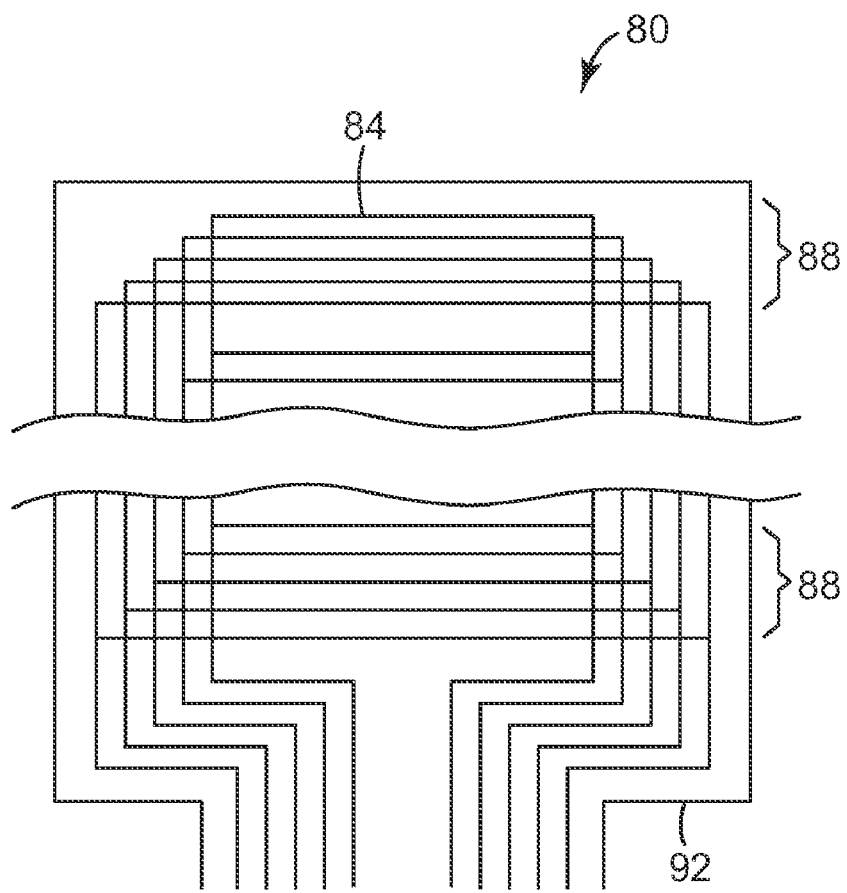
FIG. 3 is a schematic view of a sensor array for a touch screen apparatus for one embodiment of the invention.

In another embodiment of the invention, a touch sensor incorporates a patterned conductive polymer. A patterned conductive polymer is not uniform, but instead includes a pattern or repeating pattern such as parallel bars of conductive polymer or parallel and perpendicular bars of conductive polymer. One example is a near field imaging sensor that includes a patterned conductive polymer in the active area as shown in FIG. 3. Near field imaging (NFI) sensor technology is described in U.S. Pat. No. 5,650,597 to Redmayne, which is hereby incorporated by reference herein in its entirety. The circuitry for this embodiment may be constructed as taught in U.S. Pat. No. 5,650,597. The sensor array 80 includes a plurality of horizontal sensor bars 84. The horizontal bars 84 may be grouped into sets 88 including a number of bars. The left and right sides of each horizontal bar 84 are connected to an excitation signal. When the excitation signal is provided to one side of the bars 84, the other side of the bars 84 is simultaneously grounded. The provision of the excitation signals and the detection of sensor signals from the grounded side of the array are processed by the touch sensor circuitry (not shown in FIG. 3) to compute a touch location. A guard conductor 92 may be provided to eliminate parasitic loads and may be driven by the excitation signal.

An NFI touch device is capable of establishing a capacitive coupling through a larger gap than is a touch device having a uniform resistance surface. As a result, an NFI touch device can often detect a touch of a gloved hand. This increased sensitivity also allows for a substrate of a resistance element to serve as the interface with the user. For example, a conductive pattern may be formed on a first side of a substrate and the user can interface with the second side of the substrate to create a capacitive coupling with the conductive pattern through the substrate. This arrangement eliminates the need for a protective layer on the resistance element.

The pattern of sensor bars 84 may be created using different printing methods such as ink jetting, screen printing, and stencil printing. Alternatively, the pattern may be created using different patterning techniques such as lithography, laser ablation, heat or photo bleaching, or other methods, or a combination of these methods.

Preferably, linearizing edge terminations for the resistance element are provided as known in the prior art. The term linearizing, as used here, means that a uniform current density can be produced throughout a touch resistance surface of uniform resistivity by connecting appropriate voltages to the edge terminations. The resistive touch surface when linearized has the additional property that the location on the surface of a source of sink of electric current can be determined from measurements of the fraction of the current flowing through each connection to the edge terminations. One example of preferred linearizing edge terminations are described as illustrated in U.S. Pat. No. 4,371,746, which was previously incorporated by reference.

Some of the advantages of using a conductive polymer for the resistance element of the present invention will now be described. TCOs typically require high temperature processing to optimize both transmission and conductivity. Processing temperatures range from 100-330° C. and involve depositing the film at elevated temperatures as well as a post-deposition annealing step. A TCO processed at a lower temperature will likely have inferior optical and electrical properties. The high temperature processing of TCOs limits the type of substrate that may be used. The TCO coatings are typically created by a vacuum deposition step, which is fairly expensive and takes place at fairly high temperatures.

Conductive polymers, on the other hand, do not require high temperature processing. They can be coated out of water with a drying step of about 100° C. The lower temperature processing of a conductive polymer resistance element may allow the use of other substrates for capacitive touch screens, such as PET.

Sheets of conductive polymers may be formed in many different ways, many of them less expensive and time consuming than the formation techniques used for TCOs. Conductive polymers may be solvent coated at high coating speeds. Conductive polymers may be screen printed, inkjet printed, die coated or dip coated and may be deposited selectively.

The index of refraction of a TCO is typically in the range of 1.9 to 2.4. The high index reduces transmission and increases reflection, thereby reducing the overall contrast of a display seen through the touch screen. In contrast, conductive polymers have an index of refraction in the range of 1.5 to 1.8.

TCOs are generally fairly brittle and, as a result, tend to crack, especially when coated on a flexible substrate such as polyethylene tetrahalate. Severe local bending of the top sheet at a touch point may result in the TCO cracking. Cracks in the TCO layer lead to device failure, non-uniformity of the voltage field across the TCO layer, and reduced accuracy of the touch position calculations. Conductive polymers are generally not brittle. For example, a PET substrate coated with a conductive polymer may be bent at a sharp radius without damaging the conductive polymer.

TCOs generally have higher transmission in the green and red regions of the visible light spectrum than in the blue. For example, for given ITO deposition parameters, the resulting ITO film had an absorption coefficient of $0.9\ \mu m^{-1}$ at a wavelength of 450-500 nm and $0.74\ \mu m^{-1}$ at a wavelength of 400 to 500 nm. Lower transmission in the blue makes a displayed image look green, which is undesirable, particularly because most displays are deficient in blue. Conductive polymers generally have higher transmission in blue than in the rest of the visible light spectrum.

Conductive polymers may be coated more thickly than a TCO while still achieving the same optical and electrical properties. As a result, the effect of any irregularities in the uniformity of the coating may be reduced.

EXAMPLE 1

A conductive polymer solution was prepared by mixing 965.25 grams of Baytron P® PEDOT:PSS solution (Baytron P commercially available from Bayer) with 321.75 grams of dimethyl sulfoxide, 77.4 grams of ethylene glycol, 27 grams of 3-glycidoxypropyltrimethoxysilane, 1600.2 grams of isopropyl alcohol, and 9 grams of Surfynol 61 surfactant (commercially available from Kremer Pigmente). A soda-lime glass substrate was dip coated with the above solution using a precision dip coater at 0.170 inches per second withdrawal speed. The coated substrate was subsequently baked at 85° C. for 6 minutes resulting in a sheet resistance of 2500-3000 ohms/square. Next, a silver-based linearization pattern and wire traces were screen printed on one side of the coated substrate. The printed substrate was then cured at 130° C. for 6 minutes. Next, a protective coating was applied to both sides of the sensor using a silicone modified polyacrylate solution. The coated touch sensors were cured at 66° C. for 1 hour. The optical transmittance of the sensor was 76%. A vertical and horizontal finger drawing on the sensor produced a maximum line deviation of 1%.

EXAMPLE 2

A capacitive sensor was fabricated by screen-printing a linearization pattern and wire traces, using conductive silver ink, onto the surface of an Agfa EL1500 conductive polymer film (commercially available from Agfa-Gevaert N.V.) on PET. The conductive polymer film had an average optical transmission of about 88% and an averaged sheet resistance measured at about 1200 ohms/square. After the printing process the ink was cured at 100° C. for 1 hour. The wire trace lines were electrically isolated from the linearization pattern by $CO_2$ laser ablation of the conductive polymer coating. The sensor was cut to its final shape using a $CO_2$ laser that cut through both the conductive polymer coating and the PET substrate. A vertical and horizontal finger drawing on the sensor produced a maximum line deviation of 1%.

The above specification, examples and data provide a complete description of the manufacture and use of the invention. Since many embodiments of the invention can be made without departing from the spirit and scope of the invention, the invention resides in the claims hereafter appended.

What is claimed is:

1. A capacitive touch screen comprising:
    a touch area comprising a substantially transparent conductive polymer acting as a primary signal carrier for making a capacitive coupling to an object at a touch location; and
    circuitry connecting the conductive polymer of the touch area to a power source, the circuitry configured to determine the touch location.

2. The capacitive touch screen of claim 1 wherein the touch area does not include a transparent conductive oxide.

3. The capacitive touch screen of claim 1 wherein the conductive polymer is the only transparent conductive element in the touch area.

4. The capacitive touch screen of claim 1 further comprising a protective coating on the conductive polymer.

5. The capacitive touch screen of claim 4 wherein the protective coating serves as a dielectric layer.

6. The capacitive touch screen of claim 1 wherein the conductive polymer is PEDOT.

7. The capacitive touch screen of claim 1 further comprising: a substrate wherein the touch area is formed on the substrate; and a display device positioned adjacent to the substrate.

8. The capacitive touch screen of claim 1 further comprising a rigid substrate, wherein the touch area is formed on the substrate.

9. The capacitive touch screen of claim 1 further comprising a flexible substrate, wherein the touch area is formed on the substrate.

10. The capacitive touch screen of claim 1 wherein the touch area comprises a sheet of conductive polymer having a substantially uniform resistance.

11. The capacitive touch screen of claim 1 wherein the touch area comprises a pattern of conductive polymer.

12. The capacitive touch screen of claim 11 wherein the pattern of conductive polymer comprises a plurality of parallel sensor bars.

13. The capacitive touch screen of claim 1 wherein the touch panel is configured to create a substantially uniform current density in the touch area.

14. The capacitive touch screen of claim 1 further comprising a linearization pattern.

15. A touch panel for locating a touch point, comprising:
a current-conducting impedance surface having at least a pair of boundaries, the impedance surface comprising a conductive polymer;
wherein the touch panel is configured to cause a substantially linearized electrical current through the impedance surface, wherein currents passing through a touch point on the impedance surface from each of the boundaries determine a location of the touch point.

16. The touch panel of claim 15 wherein the impedance surface does not include a transparent conductive oxide.

17. The touch panel of claim 15 wherein the conductive polymer is the only transparent conductive element on the impedance surface.

18. The touch panel of claim 15 further comprising a protective coating on the impedance surface.

19. The touch panel of claim 18 wherein the protective coating serves as a dielectric layer.

20. The touch panel of claim 15 wherein the conductive polymer is PEDOT.

21. The touch panel of claim 15 wherein the impedance surface is formed on a flexible substrate.

22. The touch panel of claim 15 wherein the impedance surface is formed on a rigid substrate.

23. The touch panel of claim 15 wherein the impedance surface comprises a sheet of conductive polymer having a substantially uniform resistance.

24. The touch panel of claim 15 wherein the impedance surface comprises a pattern of conductive polymer.

25. The touch panel of claim 15 wherein the pattern of conductive polymer comprises a plurality of parallel sensor bars.

26. The touch panel of claim 15 further comprising a linearization pattern.

27. A touch sensitive display module comprising:
a touch area comprising a substantially transparent conductive polymer acting as a primary signal carrier for making a capacitive coupling to an object at a touch location;
circuitry connecting the conductive polymer of the touch area to a power source, the circuitry configured to determine the touch location; and
a display device having a display surface.

28. The touch sensitive display device of claim 27 wherein the touch area does not include a transparent conductive oxide.

29. The touch sensitive display device of claim 27 wherein the conductive polymer is the only transparent conductive element in the touch area.

30. The touch sensitive display device of claim 27 further comprising a protective coating on the conductive polymer.

31. The touch sensitive display device of claim 30 wherein the protective coating serves as a dielectric layer.

32. The touch sensitive display device of claim 27 wherein the conductive polymer is an intrinsically conductive polymer.

33. The touch sensitive display device of claim 27 wherein the conductive polymer is PEDOT.

34. The touch sensitive display device of claim 27 further comprising a rigid substrate, wherein the touch area is formed on the substrate.

35. The touch sensitive display device of claim 27 further comprising a flexible substrate, wherein the touch area is formed on the substrate.

36. The touch sensitive display device of claim 27 wherein the touch area comprises a sheet of conductive polymer having a substantially uniform resistance.

37. The touch sensitive display device of claim 27 wherein the touch area comprises a pattern of conductive polymer.

38. The touch sensitive display device of claim 37 wherein the pattern of conductive polymer comprises a plurality of parallel sensor bars.

39. The touch sensitive display device of claim 27 wherein the touch panel is configured to create a substantially uniform current density the touch area.

40. The touch sensitive display device of claim 27 further comprising a linearization pattern.

41. A method of making a capacitive touch screen comprising:
providing a substrate;
forming a touch area on the substrate comprising a substantially transparent conductive polymer, wherein the conductive polymer is configured to act as a primary signal carrier for making a capacitive coupling to an object.

42. The method of making a capacitive touch screen of claim 41 further comprising forming a protective layer on the touch area.

43. The method of making a capacitive touch screen of claim 41 wherein the object is selected from the group consisting of a user's body part, a conductive stylus, or a conductive stylus connected to an earth ground.

44. The method of making a capacitive touch screen of claim 41 further comprising forming a linearization pattern on the touch area.

* * * * *

UNITED STATES PATENT AND TRADEMARK OFFICE
CERTIFICATE OF CORRECTION

PATENT NO. : 7,477,242 B2  Page 1 of 1
APPLICATION NO. : 10/152260
DATED : January 13, 2009
INVENTOR(S) : Elisa M. Cross It is certified that error appears in the above-identified patent and that said Letters Patent is hereby corrected as shown below:

<u>Column 2,</u>
Line 29, delete "maybe" and insert -- may be --, therefor.

<u>Column 5,</u>
Line 48, delete "inkjet" and insert -- ink-jet --, therefor.

<u>Column 8,</u>
Line 44, in Claim 39, after "density" insert -- in --.

Signed and Sealed this

Twenty-eighth Day of April, 2009

JOHN DOLL
*Acting Director of the United States Patent and Trademark Office*